June 17, 1958   E. K. CLARK ET AL   2,838,989
TOASTER APPARATUS
Filed Dec. 27, 1954   2 Sheets-Sheet 1

INVENTORS:—
EARL K. CLARK
BERNARD F. PARR
BY
ATTORNEY

June 17, 1958  E. K. CLARK ET AL  2,838,989
TOASTER APPARATUS
Filed Dec. 27, 1954  2 Sheets-Sheet 2

INVENTORS:—
EARL K. CLARK
BERNARD F PARR
BY
ATTORNEY

United States Patent Office 2,838,989
Patented June 17, 1958

2,838,989

TOASTER APPARATUS

Earl K. Clark and Bernard F. Parr, Mansfield, Ohio, assignors to Westinghouse Electric Corporation, East Pittsburgh, Pa., a corporation of Pennsylvania Application December 27, 1954, Serial No. 477,902

1 Claim. (Cl. 99—401)

This invention relates to a casing structure for a toaster of the so-called "pop-up" type and has for an object to provide an improved casing of this kind.

A further object of the invention is to provide an improved casing of the type set forth which may be readily and economically constructed.

A still further object is to provide an improved toaster casing which is compact and of sturdy construction and readily adaptable to pleasing design or appearance.

In practicing the invention, a base structure preferably formed of a pair of metal frame members supports the usual partitions which are spaced apart for defining a toasting chamber within the casing. A shell of inverted U-shape and open at the ends is attached adjacent its ends to the frame members. End covers, preferably of moulded plastic, are attachable to upper portions of the shell and are provided with respective foot portions extending beneath the base and providing spaced feet for the support of the toaster. The foot portions of the end covers are firmly secured to lower marginal portions of the shell and to the spaced frame members to complete the assembly. This method of securing the recited elements together provides a casing structure which is compact and sturdy.

The foregoing and other objects are effected by the invention as will be apparent from the following description taken in connection with the accompanying drawings, forming a part of this application, in which.

Figure 1:
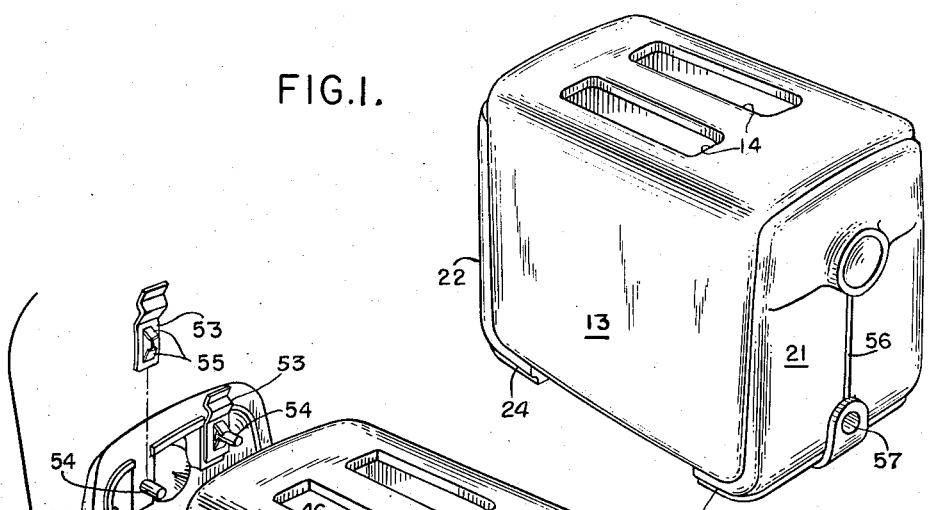
Fig. 1 is a perspective of a toaster casing structure constructed in accordance with the invention.

Reference will now be had to the drawings wherein a two slice toaster casing structure constructed and arranged in accordance with the invention is disclosed. The casing structure includes a base generally indicated at 10 and comprising a pair of transversely spaced frame members 11 and 12. Superimposed upon the base is a shell, generally indicated at 13, of inverted U-shape and provided with a pair of slice openings 14 in the top side thereof. Arranged within the shell 13 are a pair of transversely extending partitions 15 and 16 dividing the interior of the shell into the usual toasting oven generally indicated at 17 and a compartment 18 in which the mechanism for operating the toaster is usually disposed. In the interest of brevity and clearness, the heaters, guide wires, bread carriers and so forth usually found in the oven of toasters of this kind have not been shown nor has the timing mechanism usually found in the compartment 18 been illustrated. It will be understood that any suitable apparatus of this kind may be employed and that it forms no part of the present invention. The casing structure further includes end covers 21 and 22 for closing the open ends of the shell 13, which covers are provided, respectively, with foot portions 23 and 24 extending beneath the base 10 and defining the support for the toaster.

The frames 11 and 12 of the base may be similarly formed from sheet metal and each includes a generally horizontal plate portion 25 having a down turned flange 26 formed on the outer edge thereof and a generally vertical web 27 extending upwardly from the inner edge of the plate 15. The ends of the web 27 are provided with horizontally extending ears 28 and 29 for the support of the partitions 15 and 16. The latter are provided with lower horizontal flanges 31 and 32 which are secured to the ears 28 and 29 by self-tapping sheet metal screws 33 and 34. The web portions 27 of the frames 11 and 12 are provided at their ends with generally vertical ears 35 and 36 to which the ends of the shell 13 are attached as described hereinafter.

Angle support members 37 are secured to the bottom of the partitions 15 and 16 in any suitable manner such as, for example, by self-tapping screws 38. The supports 37 have upwardly facing notches 39 for receiving the lower edges of flat heating elements (not shown) usually employed in the toasting oven. The upper edges of the elements may be positioned in downwardly facing notches 41 in projections 42, the latter extending inwardly of the oven 17 from the partitions 15 and 16. As shown, the upper marginal portion of the partitions 15 and 16 may be graced by a bar 43 fixed at its ends to the partitions in any suitable manner.

Figure 2:
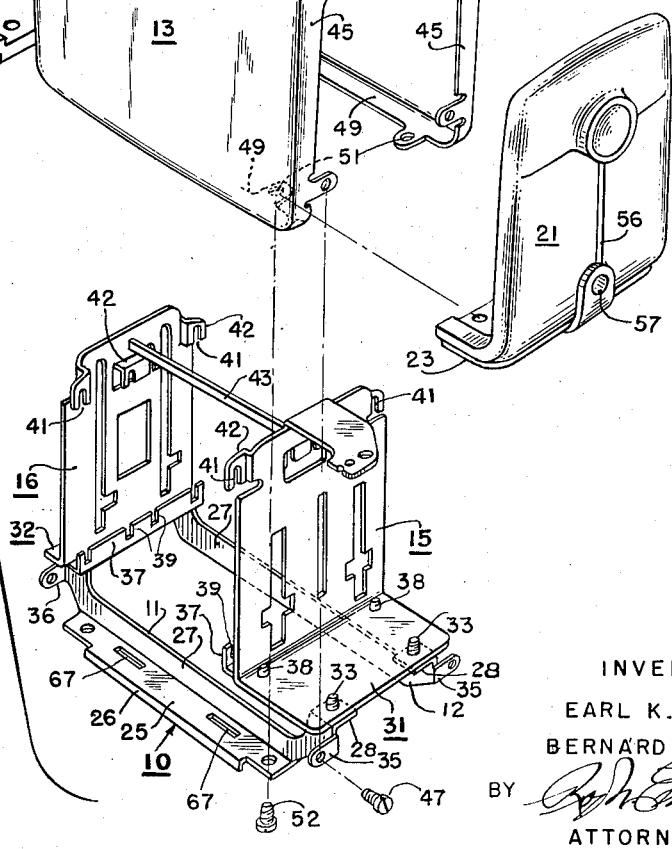
Fig. 2 is an exploded view in perspective of the casing shown in Fig. 1.

The assembled structure described up to the present is shown in the lower part of the exploded view of Fig. 2. It will be apparent from this view that all portions of the assembly are readily accessible for the attaching of various elements of the toasting and timing mechanisms (not shown) to the assembly. At this time, the assembly is maintained sufficiently rigid by the screws 33 and 34 to permit the complete assembling operation just referred to. As set forth more in detail hereinafter, the attachment of the shell 13 to the assembly further braces the latter and provides a very sturdy toaster construction.

The shell 13 as best illustrated in Fig. 2 is of inverted U-shape in cross section and open at its ends. The ends and the bottom margins of the shell 13 are flanged as shown. The end flanges 45 and 46 extend inwardly of the shell 13 and are attached to the vertical ears 35 and 36 of the base structure 10 by means of self-tapping screws 47 and 48. The latter pass through suitable openings in the flanges 45 and 46 and are threaded in the ears 35 and 36. The flanged shell structure also includes, at its lower margin, generally horizontal flanges 49 having openings 51 for self-tapping screws 52 further reference to which is made hereinafter.

Figure 3:
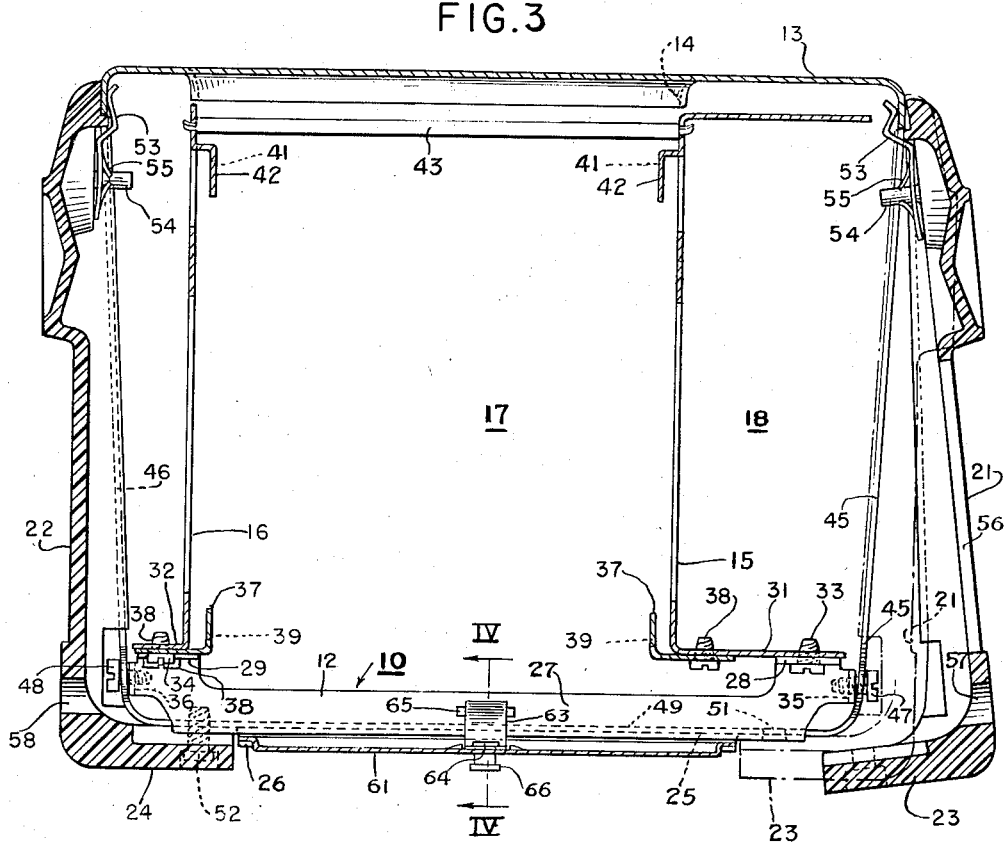
Fig. 3 is a longitudinal section taken through the toaster casing of Fig. 1.
Figure 4:
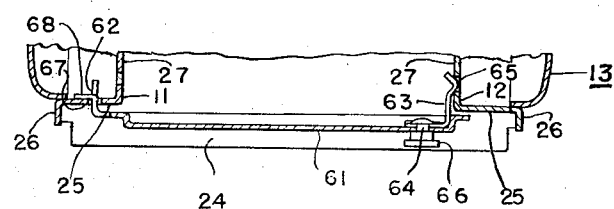
Fig. 4 is a transverse section taken along the line IV—IV of Fig. 3 and illustrating details of the crumb tray.

The end plates 21 and 22 are coupled adjacent their upper ends to the shell 13 by means of spring clips 53 which engage the inner surfaces of the flanges 45 and 46. The spring clips 53 are carried by cylindrical projections 54 moulded on the inner face of the end plates 21 and 22. A central portion of the clips 53 is punched out to provide a pair of resilient fingers 55 which spread apart slightly when the clip 53 is pushed over the projection 54. Since the ends of the fingers 55 are rough or burred, they tend to dig into the plastic projections 54 so that accidental dislodging of the clip from the projection 54 is precluded. It will be understood that in the assembling of the end walls to the shell 13, the outer ends of the clips 53 are inserted in back of the flanges 45 and 46 and the end plates are first moved upwardly and then toward the flanges from the full line position to the dotted line position shown in Fig. 3.

The lower ends of the end covers are secured to the shell by means of the self-tapping screws 52, the latter passing through suitable aligned openings in the end plates 21 and 22 and frames 11 and 12 for threading in the openings 51 formed in the bottom flanges 49 of the shell 13.

The end covers 21 and 22 are generally similar but it will be noted that the end cover 21 is provided with an elongated slot 56 through which the usual handle of the toaster projects. An opening 57 is also provided in this end cover for the usual color control knob. A similar opening 58 in the opposite end cover 22 is employed for passing the electric service cord through the casing.

A crumb tray 61 is provided at the bottom of the toaster and closes the space between the foot portions 23 and 24, which tray 61 extends between the frames 11 and 12. The crumb tray 61 may be hinged in any well understood manner to the frame 11, as shown at 62, and is retained in its closed position by a spring clip 63 riveted to the tray 61 as indicated at 64. The clip 63 is resiliently forced into engagement with the walls of a recess 65 formed in the frame 12 for maintaining the tray 61 in its closed position. The rivet 64 may be provided with a head or finger portion 66 which may be grasped by the operator when moving the tray. Each of the hinges 62 may be conveniently formed by a plurality of fingers formed integrally with the tray 61 and projecting through elongated openings 67 formed in the frame 11. One of these fingers is bent at right angles as shown at 68 in order to prevent the fingers from being dislodged through the opening 67 as the tray 61 is operated from one position to another.

From the foregoing description, it will be apparent that the toaster casing may be readily and economically constructed. In this connection, the shell employed having bends of simple curvature, may be formed on a tangent bender without the use of expensive tooling. The end covers may be formed of drawn metal or preferably they are molded from a suitable plastic as shown. The end covers and shell are readily removable from the base exposing all of the toasting mechanism and facilitating the servicing of any portion thereof while retaining the mechanism in its operative position.

While the invention has been shown in but one form, it will be obvious to those skilled in the art that it is not so limited, but is susceptible of various changes and modifications without departing from the spirit thereof.

What is claimed is:

In a toaster casing, the combination of a pair of laterally spaced frames forming a base, a shell of inverted U-shape disposed above the base and having lower marginal portions and open ends, said shell having inwardly extending generally vertical flanges formed about the open ends thereof and generally horizontal flanges extending inwardly from its lower marginal portions, a pair of transverse partitions fixed to the frames and defining a toasting chamber within the shell, a pair of end covers for the open ends of the shell including respective foot portions extending beneath the frames and forming supports therefor, respective clips secured to upper portions of the covers and coupling the latter to upper regions of said vertical flanges of the shell, a plurality of fastening devices securing said vertical flanges of the shell to the ends of said frames and a plurality of screws securing said foot portions of the end covers, said horizontal flanges and the frames together.

References Cited in the file of this patent

UNITED STATES PATENTS

| | | |
|---|---|---|
| 2,046,810 | Cannon | July 7, 1936 |
| 2,262,498 | Holm-Hansen | Nov. 11, 1941 |
| 2,326,589 | Weeks | Aug. 10, 1943 |
| 2,457,023 | Zeit | Dec. 21, 1948 |
| 2,459,169 | Koci | Jan. 18, 1949 |
| 2,542,231 | Campbell | Feb. 20, 1951 |
| 2,622,505 | Olson et al. | Dec. 23, 1952 |
| 2,693,142 | Ireland | Nov. 2, 1954 |